(12) United States Patent
Bhuvanagiri et al.

(10) Patent No.: US 9,591,254 B2
(45) Date of Patent: Mar. 7, 2017

(54) DEVICE AND METHOD FOR PROCESSING VIDEO DATA

(71) Applicant: QUALCOMM Incorporated, San Diego, CA (US)

(72) Inventors: Aditya Bhuvanagiri, Hyderabad (IN); R. V. Jagannadha Rao Doddi, Hyderabad (IN); Ajit Deepak Gupte, Bangalore (IN); Ashish Bajaj, Hyderabad (IN); Rajeshwar Kurapaty, Hyderabad (IN); Aravind Korlepara, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/670,146

(22) Filed: Mar. 26, 2015

(65) Prior Publication Data

US 2016/0286155 A1   Sep. 29, 2016

(51) Int. Cl.
| | |
|---|---|
| *H04N 5/775* | (2006.01) |
| *H04N 9/80* | (2006.01) |
| *H04N 5/77* | (2006.01) |
| *G11B 20/00* | (2006.01) |
| *G11B 20/12* | (2006.01) |
| *G11B 27/031* | (2006.01) |
| *G11B 31/00* | (2006.01) |
| *H04N 5/232* | (2006.01) |

(Continued)

(52) U.S. Cl.
CPC ....... *H04N 5/772* (2013.01); *G11B 20/00007* (2013.01); *G11B 20/12* (2013.01); *G11B 27/031* (2013.01); *G11B 31/006* (2013.01); *H04N 5/23293* (2013.01); *H04N 5/783* (2013.01); *H04N 5/915* (2013.01); *H04N 7/0122* (2013.01); *H04N 9/8042* (2013.01); *G09G 2340/0435* (2013.01); *G11B 2020/00072* (2013.01); *H04N 19/132* (2014.11);
(Continued)

(58) Field of Classification Search
USPC .................. 386/223–224, 230, 248, 328–331
See application file for complete search history.

(56) References Cited

U.S. PATENT DOCUMENTS

| | | | |
|---|---|---|---|
| 5,363,264 A | 11/1994 | Cavanaugh et al. | |
| 7,756,203 B2 * | 7/2010 | Nozawa | H04N 19/587 375/240.12 |

(Continued)

FOREIGN PATENT DOCUMENTS

| | | |
|---|---|---|
| EP | 0708564 A2 | 4/1996 |
| EP | 1993460 A2 | 11/2008 |
| WO | WO 2008026070 A2 | 3/2008 |

OTHER PUBLICATIONS

International Search Report and Written Opinion—PCT/US2016/022929—ISA/EPO—Jun. 1, 2016.

*Primary Examiner* — Nigar Chowdhury
(74) *Attorney, Agent, or Firm* — Knobbe, Martens, Olson & Bear, LLP

(57) ABSTRACT

An apparatus configured to record and process video information includes a memory, display, and a processor in communication with the memory and the display. The memory is configured to store video data. The display is configured to display a preview of the video data. The processor is configured to record the video data at a first frame rate, process the recorded video data via removing one or more frames from the recorded video data, the processed video data having a second frame rate that is lower than the first frame rate, and generate the preview to be displayed by the display based at least in part on the processed video data.

28 Claims, 10 Drawing Sheets

(51) Int. Cl.
*H04N 5/783* (2006.01)
*H04N 5/915* (2006.01)
*H04N 7/01* (2006.01)
*H04N 9/804* (2006.01)
*H04N 19/172* (2014.01)
*H04N 19/149* (2014.01)
*H04N 19/132* (2014.01)
*H04N 19/136* (2014.01)
*H04N 19/14* (2014.01)
*H04N 19/157* (2014.01)
*H04N 19/31* (2014.01)

(52) U.S. Cl.
CPC ............ *H04N 19/136* (2014.11); *H04N 19/14* (2014.11); *H04N 19/149* (2014.11); *H04N 19/157* (2014.11); *H04N 19/172* (2014.11); *H04N 19/31* (2014.11)

(56) References Cited

U.S. PATENT DOCUMENTS

| | | |
|---|---|---|
| 8,237,856 B2 | 8/2012 | Boland et al. |
| 8,849,090 B2* | 9/2014 | Kosakai ................. H04N 5/232 386/219 |
| 2003/0031251 A1 | 2/2003 | Koto |
| 2005/0093773 A1* | 5/2005 | Kuroki .................... G09G 3/20 345/30 |
| 2006/0285831 A1* | 12/2006 | Tanaka .................. H04N 5/232 386/233 |
| 2010/0111489 A1 | 5/2010 | Presler |
| 2010/0157090 A1* | 6/2010 | Kobayashi ............... H04N 5/77 348/222.1 |
| 2013/0106810 A1 | 5/2013 | Kim et al. |
| 2013/0329075 A1 | 12/2013 | Liang et al. |
| 2014/0010294 A1 | 1/2014 | Ye et al. |
| 2014/0071326 A1 | 3/2014 | Jang et al. |
| 2014/0301457 A1 | 10/2014 | Pu et al. |

* cited by examiner

DEVICE AND METHOD FOR PROCESSING VIDEO DATA

TECHNICAL FIELD

This disclosure relates to the field of video recording, coding, and compression, particularly to processing video data in video recording devices.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video devices having video recording capabilities may be used to record video data so that the recorded video data can be viewed at a later time. When such video devices are recording video data, the video devices typically display a preview of the video data currently being recorded. For example, when a user activates the video recording function on his or her video device, the display screen/unit provided on the video device may display a preview of what the camera provided on the video device is currently recording, so that the user can ensure that the desired recording object is correctly positioned within the field of view of the camera. Thus, the video device may consume some of the available bandwidth and power available to the video device for generating and displaying the preview, and the bandwidth and power consumption may be proportional to the quality and/or size of the recorded video data.

SUMMARY

The systems, methods, and devices of this disclosure each have several innovative aspects, no single one of which is solely responsible for the desirable attributes disclosed herein.

In one aspect, an apparatus configured to record and process video information includes a memory, display, and a processor in communication with the memory and the display. The memory is configured to store video data. The display is configured to display a preview of the video data. The processor is configured to record the video data at a first frame rate, process the recorded video data via removing one or more frames from the recorded video data, the processed video data having a second frame rate that is lower than the first frame rate, and generate the preview to be displayed by the display based at least in part on the processed video data.

In another aspect, a method of recording and processing video information includes recording video data at a first frame rate, processing the recorded video data via removing one or more frames from the recorded video data, the processed video data having a second frame rate that is lower than the first frame rate, generating a preview of the recorded video data based at least in part on the processed video data, and displaying the generated preview of the recorded video data.

In another aspect, a non-transitory computer readable medium contains code that, when executed, causes an apparatus to record video data at a first frame rate, process the recorded video data via removing one or more frames from the recorded video data, the processed video data having a second frame rate that is lower than the first frame rate, generate a preview of the recorded video data based at least in part on the processed video data, and display the generated preview of the recorded video data.

In another aspect, a video device configured to record and process video information includes means for recording video data at a first frame rate, means for processing the recorded video data via removing one or more frames from the recorded video data, the processed video data having a second frame rate that is lower than the first frame rate, means for generating a preview of the recorded video data based at least in part on the processed video data, and means for displaying the generated preview of the recorded video data.

DETAILED DESCRIPTION

Figure 1A:
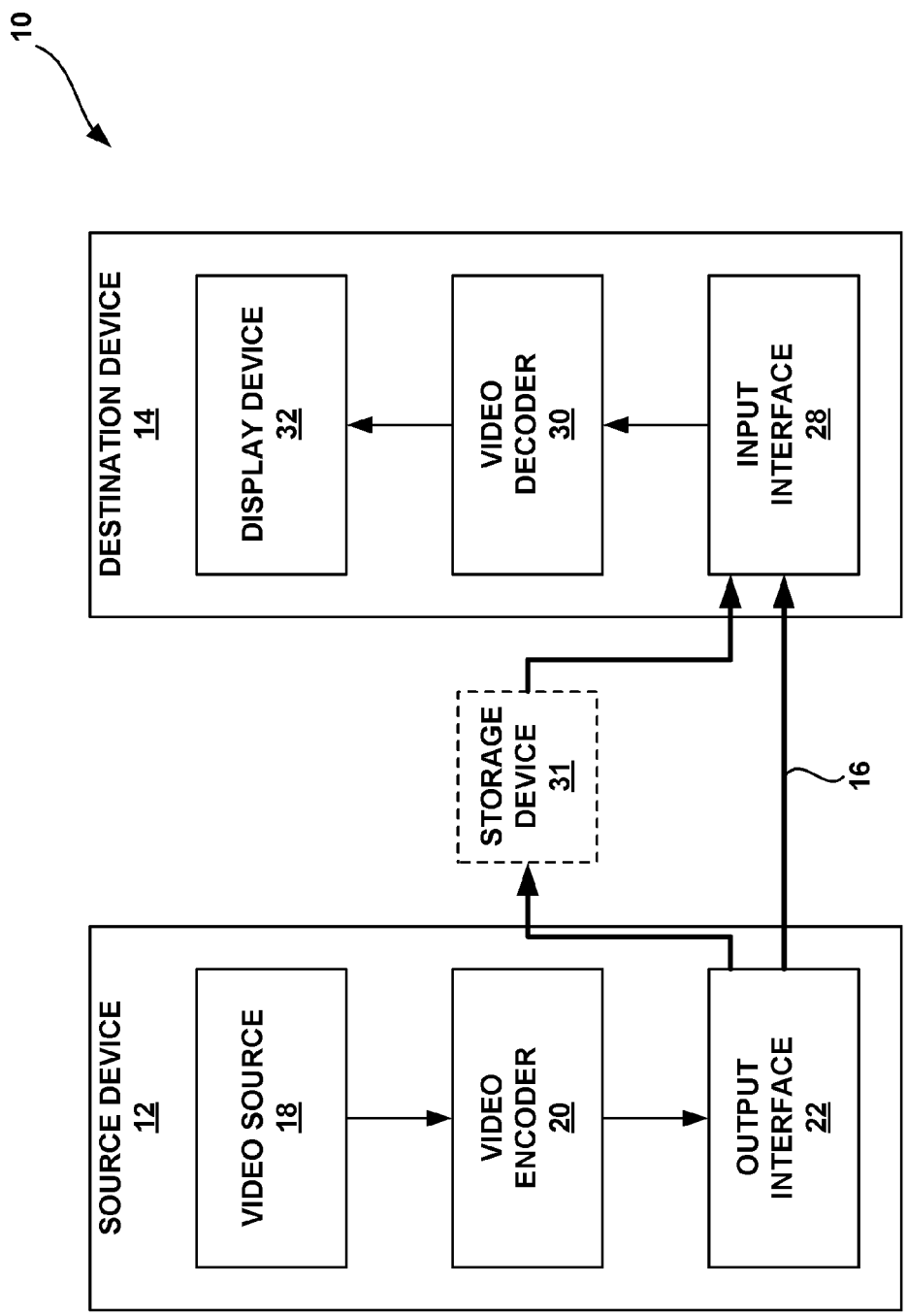
FIG. 1A is a block diagram illustrating an example video encoding and decoding system that may utilize techniques in accordance with aspects in this disclosure.

In general, this disclosure relates to video data processing in the context of video recording devices. More specifically, the present disclosure relates to systems and methods for recording video data, processing the video data, and generating previews displayed by video recording devices based on the processed video data.

In a video device having video recording capabilities (e.g., a smart phone, a digital camcorder, etc.), after video data is recorded by the camera of the video device, the recorded video data is typically provided (i) to an encoder so that the recorded video data can be converted into a coded bitstream (e.g., for compression before storage and/or transmission) and (ii) to the display so that a preview of the recorded video data can be displayed to the user. The user may use the preview displayed on the display to aim the camera at the desired recording object and ensure that the desired recording object is correctly positioned within the field of view of the camera.

However, as the quality of the video data recorded by the video device improves, the size of the recorded data may also increase and cause the processing performed by the video device in order to generate and display a preview of the recorded video data to consume more bandwidth and power. For example, generating and displaying a preview of high-definition (HD) and ultra-high-definition (UHD) video data may require a large amount of bandwidth and power to be consumed.

Thus, an improved method for processing the video data that can reduce the bandwidth and power consumption in video recording devices is desired.

In the present disclosure, various techniques for reducing the bandwidth and power consumption requirements for processing the video data in the preview path of a video device are described. In some embodiments of the present disclosure, the video device removes a portion of the video data (e.g., by discarding one or more frames in the video data) in order to reduce the amount of video data to be processed in the preview path. For example, if the video data is recorded at 30 frames per second (fps), every sixth frame may be removed from the video data, and as a result, the resulting video data that needs to be processed in the preview path becomes 25 fps.

Further, the present disclosure describes various techniques for coding the video data in a bitstream. Any information generated while coding the video data may be utilized in processing the video data in the preview path. For example, encoder statistics generated during the coding (e.g., encoding or decoding) process may be used to select which portion(s) of the video data should be removed. The video device may determine, based on the information obtained during the process of encoding the video data, that certain frames in the recorded video data are redundant and thus are able to be removed from the video data in the preview path without significantly affecting the preview quality.

Video Compression Techniques

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards (e.g., including standards developed by International Telecommunication Union Telecommunication Standardization Sector [ITU-T] Video Coding Experts Group [VCEG] or International Organization for Standardization/International Electrotechnical Commission [ISO/IEC] Moving Pictures Experts Group [MPEG]): ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblocks) in certain previous video coding standards. In fact, the concept of macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as a BL, and a higher layer such as an EL) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. For example, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple BLs, RLs, and/or ELs. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely HEVC, is being developed by the Joint Collaboration Team on Video Coding (JCT-VC) of ITU-T VCEG and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video encoding and decoding 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
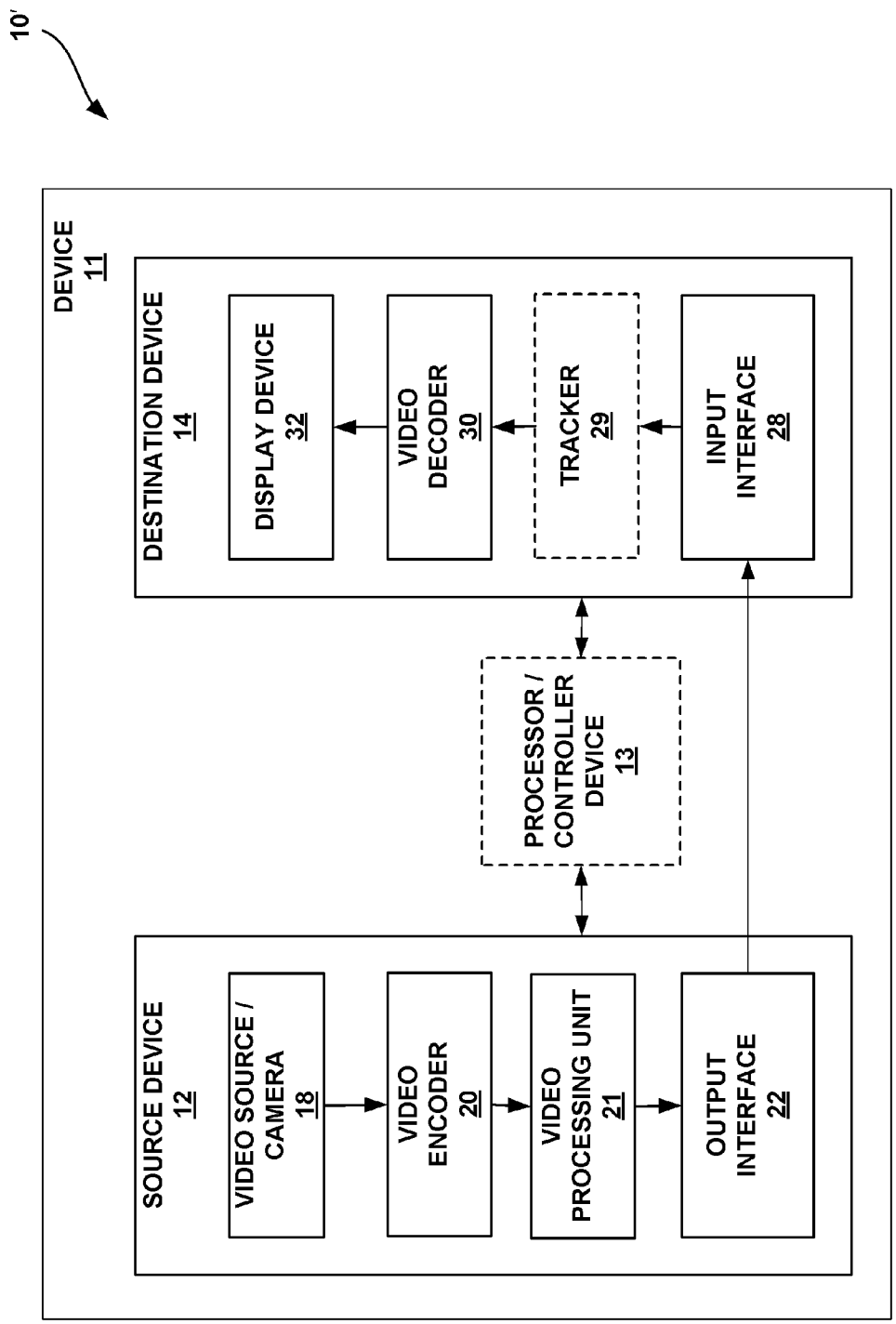
FIG. 1B is a block diagram illustrating another example video encoding and decoding system that may perform techniques in accordance with aspects in this disclosure.

As shown in FIG. 1A, video encoding and decoding 10 includes a source device 12 that generates encoded video data to be decoded at a later time by a destination device 14. In the example of FIG. 1A, the source device 12 and destination device 14 are on separate devices—specifically, the source device 12 is part of a source device, and the destination device 14 is part of a destination device. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via a link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data directly to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network [WLAN] connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video encoding and decoding 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by video encoder 20. The encoded video data may be transmitted directly to the destination device 14 via the output interface 22 of the source device 12. The encoded video data may also (or alternatively) be stored onto the storage device 31 for later access by the destination device 14 or other devices, for decoding and/or playback. Video encoder 20 illustrated in FIGS. 1A and 1B may comprise video encoder 20 illustrated FIG. 2A, video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server. Video decoder 30 illustrated in FIGS. 1A and 1B may comprise video decoder 30 illustrated FIG. 3A, video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional processor/controller device 13 in operative communication with the source and destination devices 12, 14. The system 10' of FIG. 1B may further include a video processing unit 21 between video encoder 20 and the output interface 22. In some implementations, the video processing unit 21 is a separate unit, as illustrated in FIG. 1B; however, in other implementations, the video processing unit 21 can be implemented as a portion of video encoder 20 and/or the processor/controller device 13. The system 10' may also include an optional tracker 29, which can track an object of interest in a video sequence. The object of interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

Video encoder 20 and video decoder 30 may operate according to a video compression standard, such as HEVC standard, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPSs), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as context adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
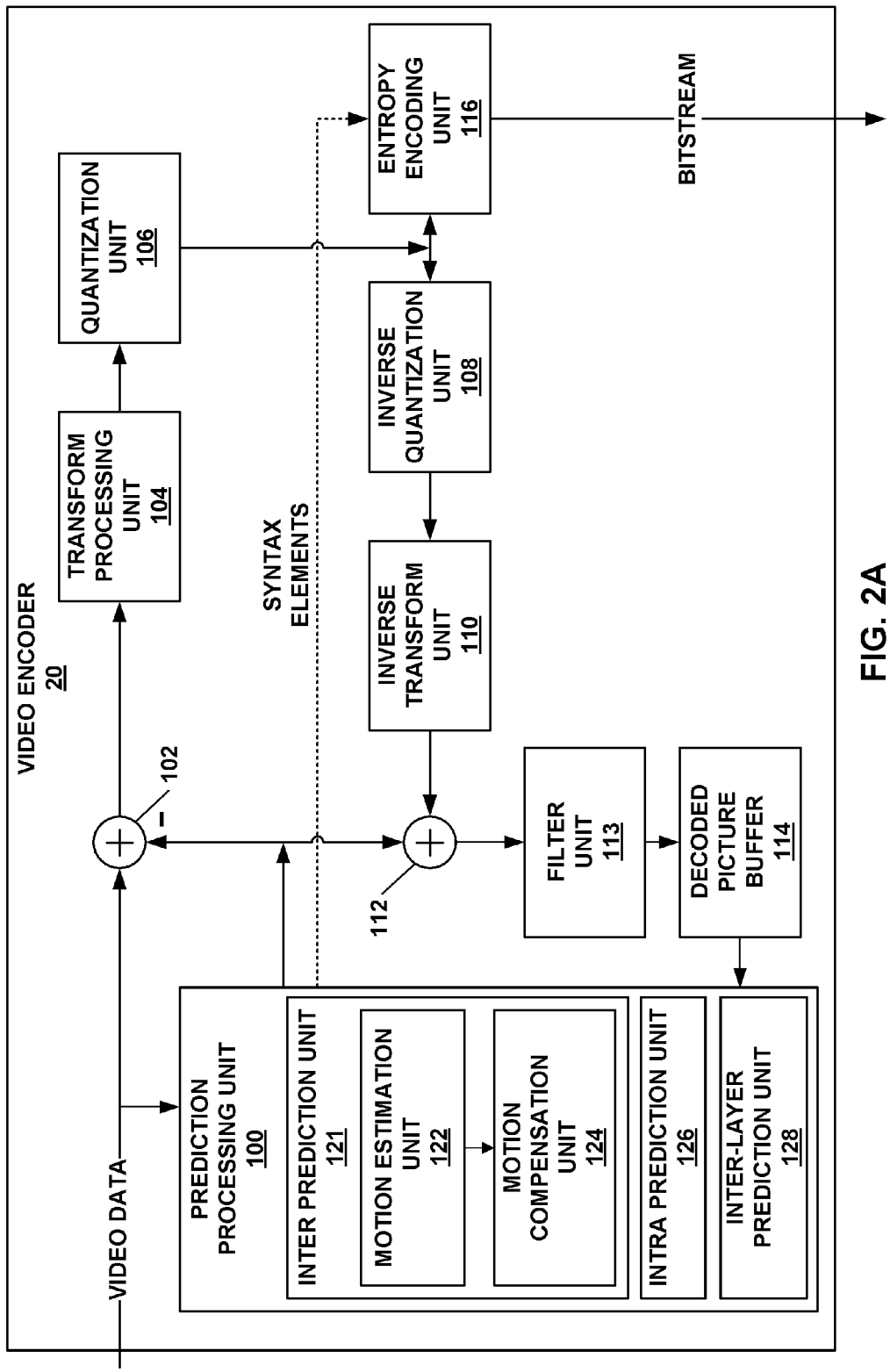
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, video encoder 20 may include inter-layer prediction unit 128. Inter-layer prediction unit 128 is configured to predict a current block (e.g., a current block in the EL) using one or more different layers that are available in scalable video coding (e.g., a BL or RL). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
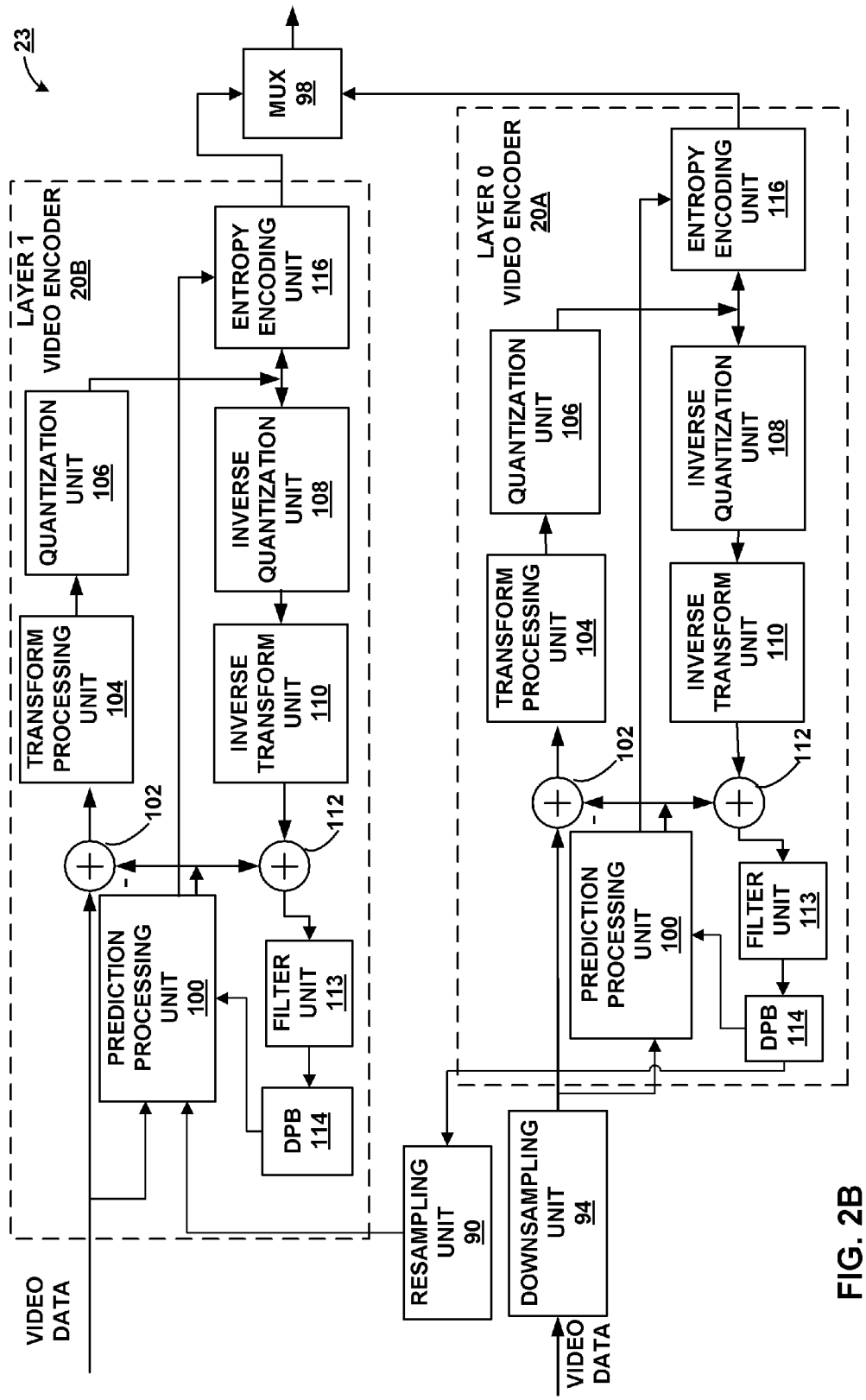
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. Video encoder 23 may be configured to process multi-layer video frames, such as for SHVC and multiview coding. Further, video encoder 23 may be configured to perform any or all of the techniques of this disclosure.

Video encoder 23 includes a video encoder 20A and video encoder 20B, each of which may be configured as video encoder 20 and may perform the functions described above with respect to video encoder 20. Further, as indicated by the reuse of reference numbers, video encoders 20A and 20B may include at least some of the systems and subsystems as video encoder 20. Although video encoder 23 is illustrated as including two video encoders 20A and 20B, video encoder 23 is not limited as such and may include any number of video encoder 20 layers. In some embodiments, video encoder 23 may include a video encoder 20 for each picture or frame in an access unit. For example, an access unit that includes five pictures may be processed or encoded by a video encoder that includes five encoder layers. In some embodiments, video encoder 23 may include more encoder layers than frames in an access unit. In some such cases, some of the video encoder layers may be inactive when processing some access units.

In addition to video encoders 20A and 20B, video encoder 23 may include a resampling unit 90. The resampling unit 90 may, in some cases, upsample a BL of a received video frame to, for example, create an EL. The resampling unit 90 may upsample particular information associated with the received BL of a frame, but not other information. For example, the resampling unit 90 may upsample the spatial size or number of pixels of the BL, but the number of slices or the picture order count may remain constant. In some cases, the resampling unit 90 may not process the received video and/or may be optional. For example, in some cases, the prediction processing unit 100 may perform upsampling.

In some embodiments, the resampling unit 90 is configured to upsample a layer and reorganize, redefine, modify, or adjust one or more slices to comply with a set of slice boundary rules and/or raster scan rules. Although primarily described as upsampling a BL, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., video encoder 20A) and to upsample the picture (or the received picture information). This upsampled picture may then be provided to the prediction processing unit 100 of a higher layer encoder (e.g., video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of video encoder 20A may be provided directly, or at least without being provided to the resampling unit 90, to the prediction processing unit 100 of video encoder 20B. For example, if video data provided to video encoder 20B and the reference picture from the decoded picture buffer 114 of video encoder 20A are of the same size or resolution, the reference picture may be provided to video encoder 20B without any resampling.

In some embodiments, video encoder 23 downsamples video data to be provided to the lower layer encoder using the downsampling unit 94 before provided the video data to video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, video encoder 23 may further include a multiplexor 98, or mux. The mux 98 can output a combined bitstream from video encoder 23. The combined bitstream may be created by taking a bitstream from each of video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of video encoders 20A and 20B. For instance, two blocks may be output from video encoder 20B for each block output from video encoder 20A. In some embodiments, the output stream from the mux 98 may be preprogrammed. In other embodiments, the mux 98 may combine the bitstreams from video encoders 20A, 20B based on a control signal received from a system external to video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from video encoder 23.

Video Decoder

Figure 3A:
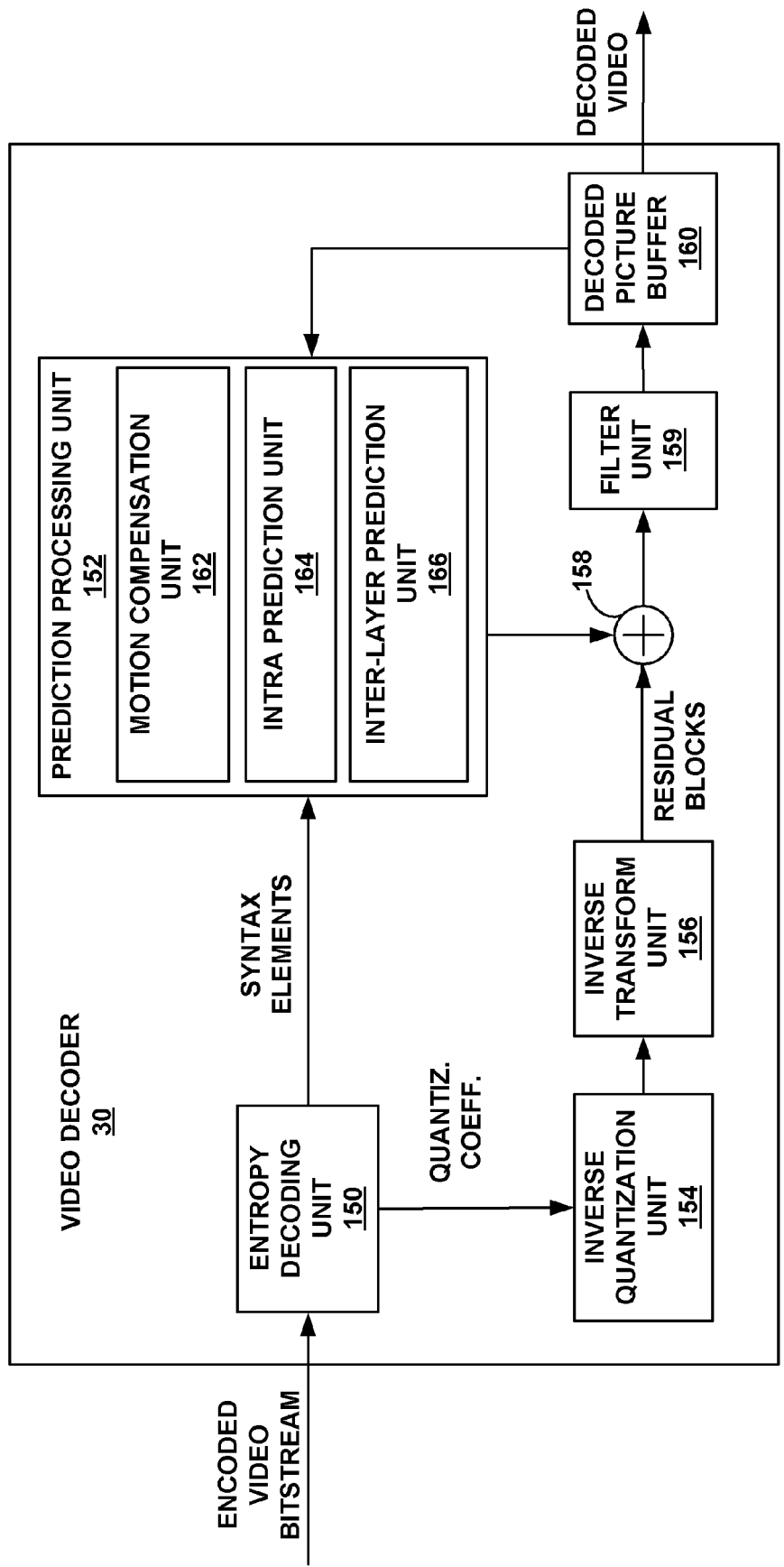
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. Video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in scalable video coding (e.g., a BL or RL). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
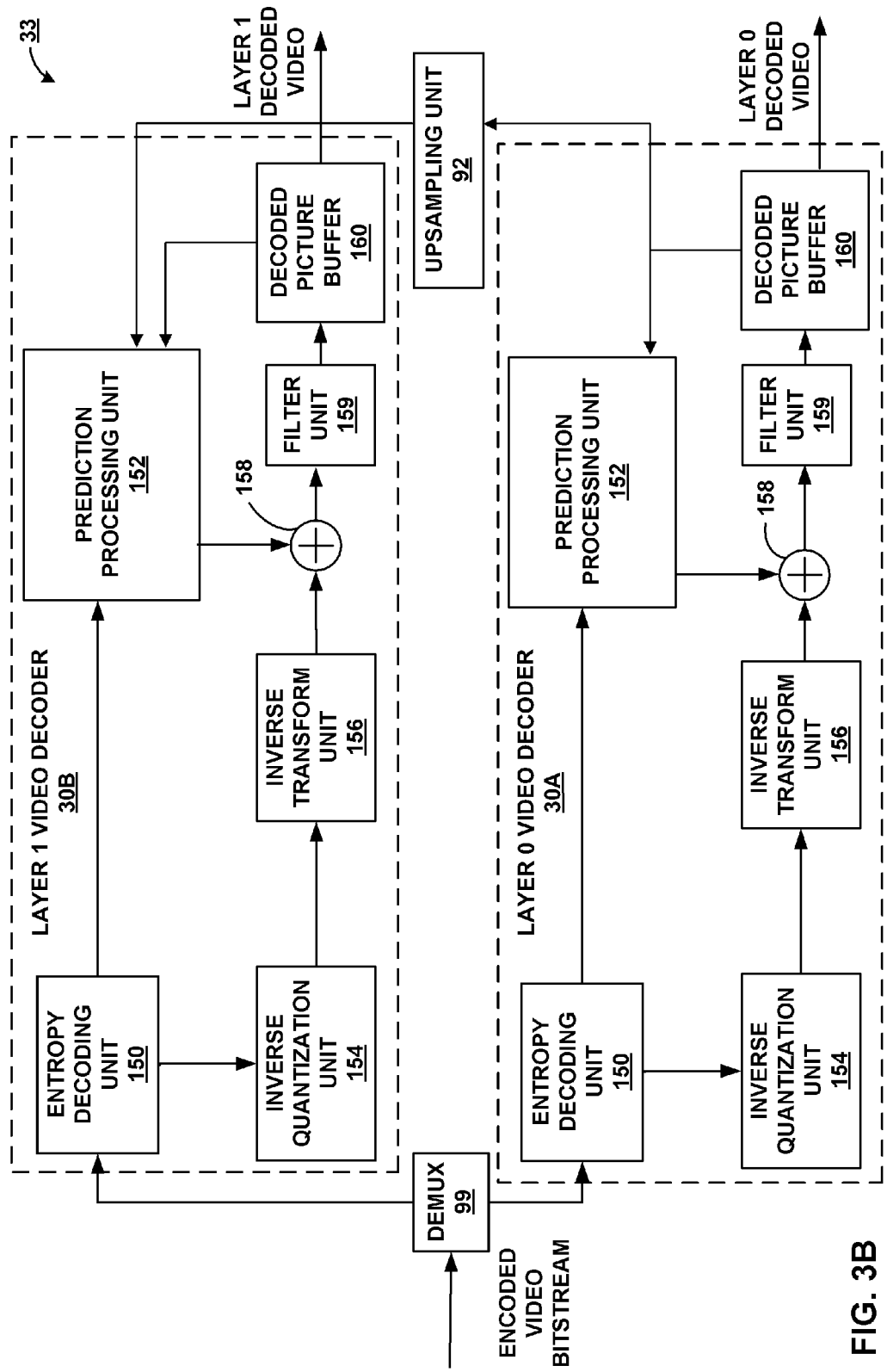
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. Video decoder 33 may be configured to process multi-layer video frames, such as for SHVC and multiview coding. Further, video decoder 33 may be configured to perform any or all of the techniques of this disclosure.

Video decoder 33 includes a video decoder 30A and video decoder 30B, each of which may be configured as video decoder 30 and may perform the functions described above with respect to video decoder 30. Further, as indicated by the reuse of reference numbers, video decoders 30A and 30B may include at least some of the systems and subsystems as video decoder 30. Although video decoder 33 is illustrated as including two video decoders 30A and 30B, video decoder 33 is not limited as such and may include any number of video decoder 30 layers. In some embodiments, video decoder 33 may include a video decoder 30 for each picture or frame in an access unit. For example, an access unit that includes five pictures may be processed or decoded by a video decoder that includes five decoder layers. In some embodiments, video decoder 33 may include more decoder layers than frames in an access unit. In some such cases, some of the video decoder layers may be inactive when processing some access units.

In addition to video decoders 30A and 30B, video decoder 33 may include an upsampling unit 92. In some embodiments, the upsampling unit 92 may upsample a BL of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., video decoder 30A) and to upsample the picture (or the received picture information). This upsampled picture may then be provided to the prediction processing unit 152 of a higher layer decoder (e.g., video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of video decoder 30A may be provided directly, or at least without being provided to the upsampling unit 92, to the prediction processing unit 152 of video decoder 30B. For example, if video data provided to video decoder 30B and the reference picture from the decoded picture buffer 160 of video decoder 30A are of the same size or resolution, the reference picture may be provided to video decoder 30B without upsampling. Further, in some embodiments, the upsampling unit 92 may be a resampling unit 90 configured to upsample or downsample a reference picture received from the decoded picture buffer 160 of video decoder 30A.

As illustrated in FIG. 3B, video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of video decoders 30A and 30B receives a portion of the bitstream at a given time. While in some cases the bits from the bitstream received at the demux 99 may be alternated one bit at a time between each of video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of video decoders 30A and 30B. For instance, two blocks may be provided to video decoder 30B for each block provided to video decoder 30A. In some embodiments, the division of the bitstream by the demux 99 may be preprogrammed. In other embodiments, the demux 99 may divide the bitstream based on a control signal received from a system external to video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by video decoder 33.

Bandwidth and Power Consumption in Video Recording Devices

As discussed above, in a video device having video recording capabilities (e.g., a smart phone, a digital camcorder, etc.), after video data is recorded by the camera of the video device, the recorded video data is typically provided (i) to an encoder so that the recorded video data can be converted into a coded bitstream (e.g., for compression before storage and/or transmission) and (ii) to the display so that a preview of the recorded video data can be displayed to the user. The user may use the preview displayed on the display to aim the camera at the desired recording object and ensure that the desired recording object is correctly positioned within the field of view of the camera.

However, as the quality of the video data recorded by the video device improves, the size of the recorded data may also increase and cause the processing performed by the video device in order to generate and display a preview of the recorded video data to consume more bandwidth and power. For example, generating and displaying a preview of high-definition (HD) and ultra-high-definition (UHD) video data may require a large amount of bandwidth and power to be consumed. For example, in any video system (e.g., camcorder system, encoder system, decoder system, etc.), there may be a memory and a graphical processor. When the memory communicates with the graphical processor, a portion of the bandwidth of the bus (e.g., Advanced eXtensible Interface (AXI) bus) between the memory and the graphical processor is consumed. Additionally, a certain amount of power is consumed as the video data is read from and/or written to the memory. In video use cases involving 1080p, 4K, etc. video data, a large amount of bandwidth and power is consumed.

Thus, an improved method for processing the video data that can reduce the bandwidth and power consumption in video recording devices is desired.

Examples of Video Devices

A video device may include various components that communicate with each other to record video data, record audio date, generate video statistics based on the recorded video and audio data, generate a preview based on video statistics, etc. In some embodiments, the encoder and the preview processor may be separate components. In other embodiments, the encoder and the preview processor may be implemented as a single component that may encode the recorded video and audio data and also process the recorded video data such that the processed video data has a lower frame rate than the recorded video data. The processed video data may further be processed by a camera post-processor (CPP), a graphical processing unit (GPU), and/or a multimedia display processor (MDP) so that a preview may be generated and displayed on the display of the video device. In some embodiments, the video device may be any one of a computer, a notebook, a laptop computer, a tablet computer, a set-top box, a telephone handset, a smart phone, a smart pad, a television, a camera, a display device, a video recording device, a camcorder, a videotelephony device, a digital media player, a video gaming console, and an in-car computer.

Figure 4:
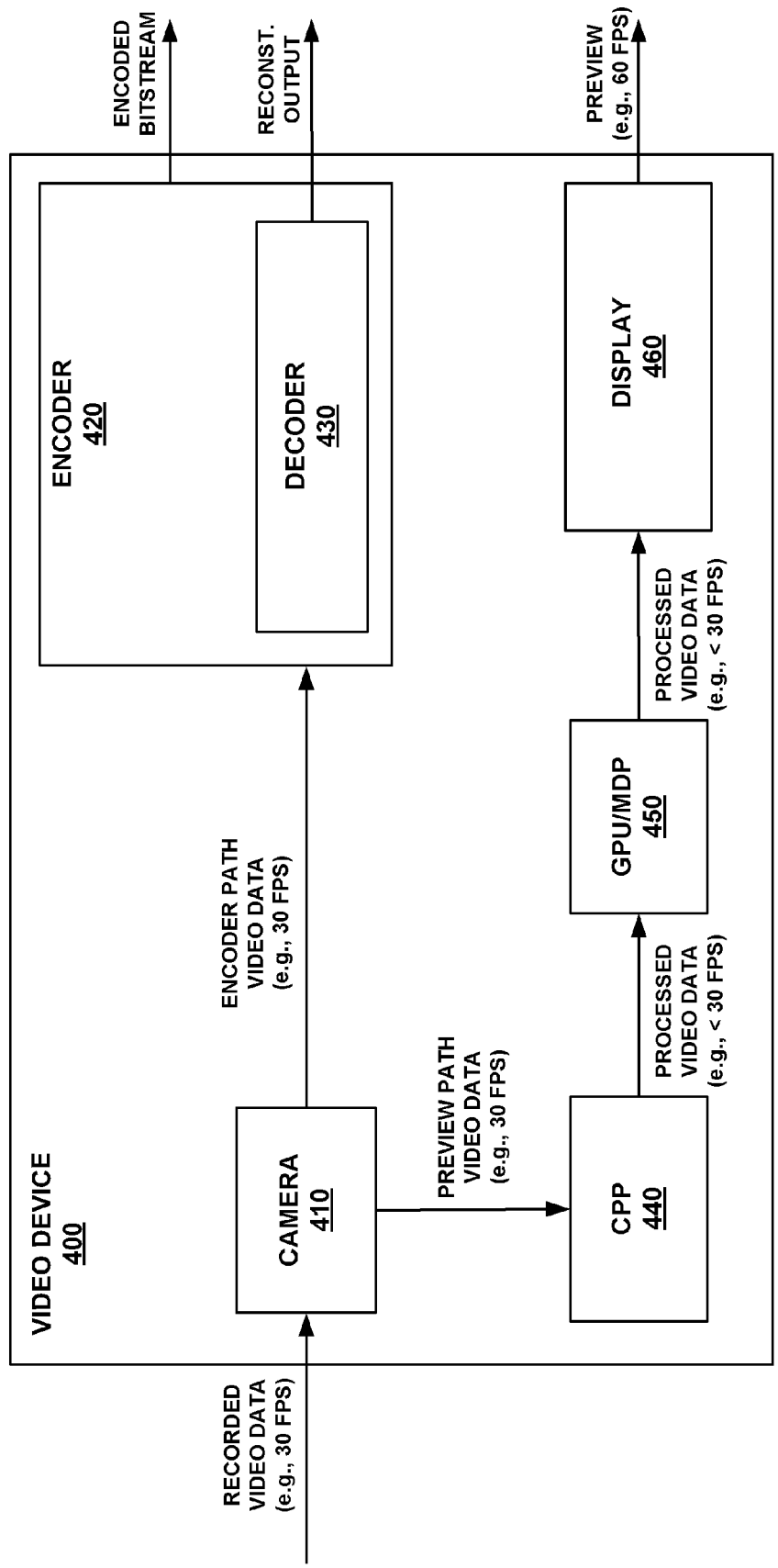
FIG. 4 is a block diagram illustrating an example video device in accordance with aspects described in this disclosure.

FIG. 4 is a block diagram that illustrates an example video device 400 that may utilize techniques in accordance with aspects described in this disclosure. In some embodiments, the video device 400 may be any one of a computer, a notebook, a laptop computer, a tablet computer, a set-top box, a telephone handset, a smart phone, a smart pad, a television, a camera, a display device, a video recording device, a camcorder, a videotelephony device, a digital media player, a video gaming console, and an in-car computer. As shown in FIG. 4, the video device 400 includes a camera 410, an encoder 420 including a decoder 430, a CPP 440, a GPU/MDP 450, and a display 460. The camera 410 may record video data (e.g., at 30 fps) and provide the recorded video data to the encoder 420 and the CPP 440. The path from the camera 410 to the encoder 420 may be referred to as the encoder path, and the path from the camera 410 to the CPP 440, GPU/MDP 450, and display 460 may be referred to as the preview path. The video data provided to the encoder 420 and the CPP 440 may have the same frame rate as the frame rate at which the camera 410 is configured to record video data (e.g., 30 fps in the example of FIG. 4). As shown in FIG. 4, the encoder 420 generates an encoded bitstream based on the video data received from the camera 410, and the decoder 430 generates a reconstructed output (e.g., by decoding the encoded bitstream).

The CPP 440 may perform certain processing on the video data received from the camera 410 before sending the processed video data to the GPU/MDP 450. The GPU/MDP 450 may comprise a GPU, an MDP, or both. For example, the CPP 440 may remove one or more frames from the video data. In one embodiment, the CPP 440 removes every 6th frame from the video data. In such an embodiment, if the video data is recorded at 30 fps, the processed video data provided from the CPP 540 to the GPU/MDP 450 has a frame rate of 25 fps. The frame rate of the processed video data may be referred to as a reduced frame rate. In another embodiment, the CPP 440 removes every N-th frame from the video data, where N is an integer greater than 1 (e.g., 2, 3, 4, 5, 6, 7, 8, 9, 10, etc.). Thus, the input to the CPP 440 may have a first frame rate, but the output of the CPP 440 may have a second frame rate that is lower than the first frame rate. Reducing the frame rate of the video data to be used for generating the preview may reduce the AXI bandwidth as well as the processing performed by the subsequent components in the preview path (e.g., GPU/MDP 450, display 460, and/or other components not illustrated in FIG. 4). As a result, the power consumption in the preview path may also be reduced. The process of reducing the frame rate of the video data is described in greater detail below with reference to FIG. 6.

The GPU/MDP 450 may compose the different layers that need to be displayed based on the processed video data. For example, in a camcorder application on a mobile device, various buttons are displayed on the screen for starting and pausing the recording, for enabling flash, for indicating the battery life, etc. The GPU/MDP 450 may compose the different layers of information and merge them into a single screen and render the composed video data on the display 460.

The display 460 may be a synchronous display (or "dumb display") or an asynchronous display (or "smart display"). A dumb display may require the system to send continuous video data (e.g., all pixels that compose a full frame for every single frame). On the other hand, a smart display may require the system to send only those portions of the video data that have changed (e.g., a subset of the frames in the video data and/or portions of each frame). A dumb display would simply read the processed video data having a reduced frame rate up to the specified display frame rate (e.g., 60 fps in the example of FIG. 4). A smart display would read the processed video data at the same frame rate, and perform additional processing to display the video data at the specified frame rate (e.g., 60 fps).

Figure 5:
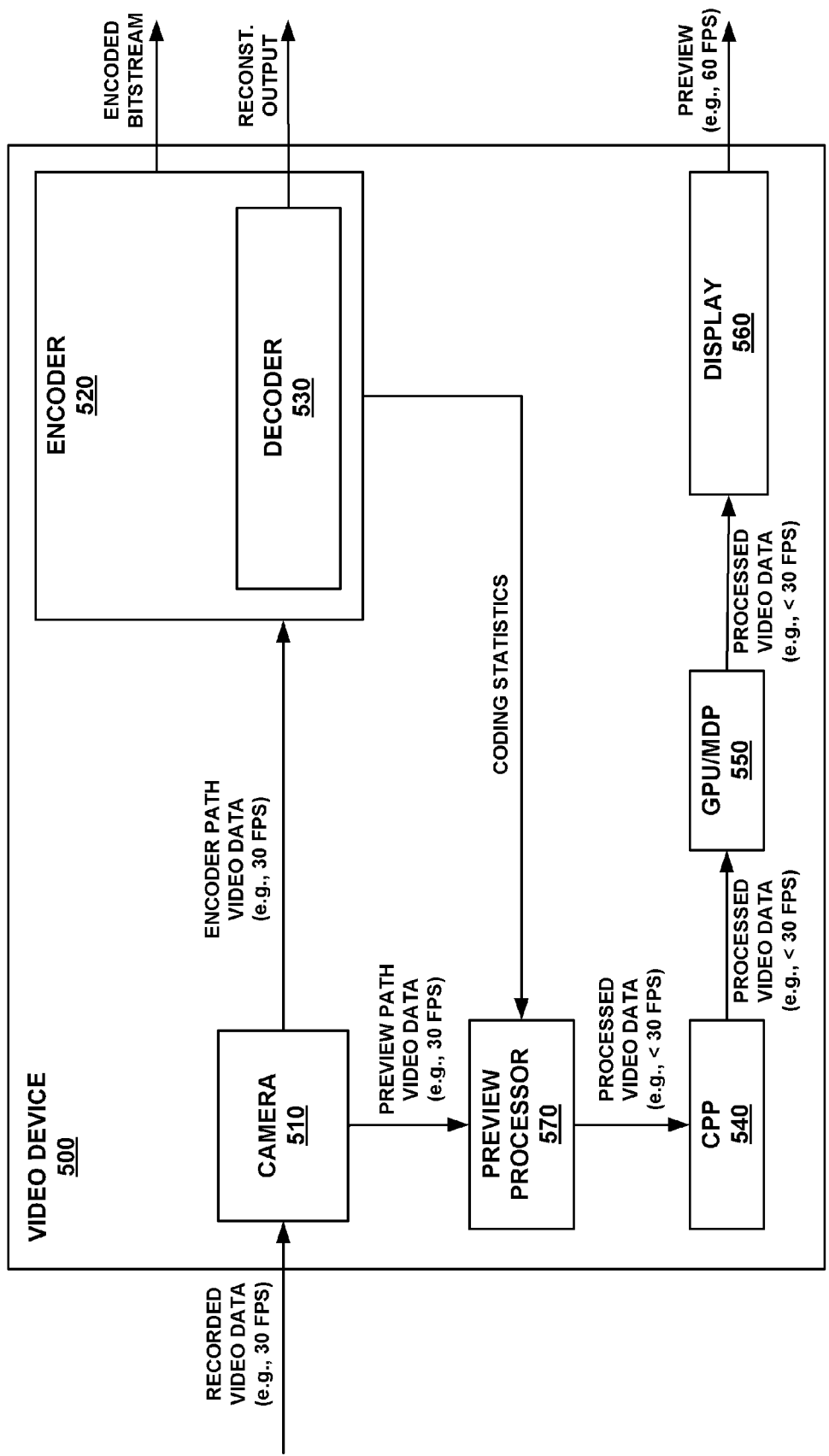
FIG. 5 is a block diagram illustrating an example video device in accordance with aspects described in this disclosure.

FIG. 5 is a block diagram that illustrates an example video device 500 that may utilize techniques in accordance with aspects described in this disclosure. In some embodiments, the video device 500 may be any one of a computer, a notebook, a laptop computer, a tablet computer, a set-top box, a telephone handset, a smart phone, a smart pad, a television, a camera, a display device, a video recording device, a camcorder, a videotelephony device, a digital media player, a video gaming console, and an in-car computer. As shown in FIG. 5, the video device 500 includes a camera 510, an encoder 520 including a decoder 530, a CPP 540, a GPU/MDP 550, a display 560, and a preview processor 570. In the example of FIG. 5, the preview processor 570 may perform some of the processing performed by the CPP 440 in FIG. 4. In the example of FIG. 5, the encoder 520 and the preview processor 570 are shown as separate components. In another embodiment, the encoder 520 and the preview processor 570 may be implemented as a single component that may encode the recorded video data and also process the recorded video data such that the processed video data has a lower frame rate than the original frame rate at which the video data is recorded. The preview processor 570 may be implemented as a hardware or software component.

The camera 510 may record video data (e.g., at 30 fps) and provide the recorded video data to the encoder 520 and the preview processor 570. The path from the camera 510 to the encoder 520 may be referred to as the encoder path, and the path from the camera 510 to the preview processor 570, CPP 540, GPU/MDP 550, and display 560 may be referred to as the preview path. The video data provided to the encoder 520 and the preview processor 570 may have the same frame rate as the frame rate at which the camera 510 is configured to record video data (e.g., 30 fps in the example of FIG. 5). As shown in FIG. 5, the encoder 520 generates an encoded bitstream based on the video data received from the camera 510, and the decoder 530 generates a reconstructed output (e.g., by decoding the encoded bitstream). The encoder 520 further provides coding statistics to the preview processor 570. The coding statistics may include any information generated during the process of encoding the recorded video data in a bitstream and/or decoding the encoded bitstream. For example, the coding statistics may comprise the number of intra-coded, inter-coded, and/or skip blocks, macroblocks, slices, tiles, or other coding units within each frame. For example, the blocks may be in the sizes of 4×4, 16×16, 8×8, 8×16, 16×8, and/or any other size. The coding statistics may also comprise an indication of the region of interest in each frame, if any. The coding statistics may also comprise the color information of each frame in the recorded video data. The color information may comprise YUV data, RGB data, luma data, and/or chroma data. The coding statistics may also comprise voice activity detection (VAD) information. The VAD information may indicate whether human voice is present in each frame. The coding statistics that may be generated by the video device are not limited to those described herein, and may include any other information that may be used to process the recorded video data.

The preview processor 570 may perform certain processing on the video data received from the camera 510 before sending the processed video data to the CPP 540. For example, the preview processor 570 may remove one or more frames from the video data. In one embodiment, the preview processor 570 removes the one or more frames from the video data based on the coding statistics received from the encoder 520. Although not illustrated, instead of coding statistics, the preview processor 570 may receive from the encoder 520 (or otherwise access) indications of which frames are to be dropped from the video data. In such a case, the preview processor 570 may remove those frames that are indicated to be removed from the video data. Thus, the input to the preview processor 570 may have a first frame rate, but the output of the preview processor 570 may have a second frame rate that is lower than the first frame rate. Reducing the frame rate of the video data to be used for generating the preview may reduce the AXI bandwidth as well as the processing performed by the subsequent components in the preview path (e.g., CPP 540, GPU/MDP 550, display 560, and/or other components not illustrated in FIG. 5). As a result, the power consumption in the preview path may also be reduced. The process of reducing the frame rate of the video data is described in greater detail below with reference to FIG. 7.

The GPU/MDP 550 may compose the different layers that need to be displayed based on the processed video data. For example, in a camcorder application on a mobile device, various buttons are displayed on the screen for starting and pausing the recording, for enabling flash, for indicating the battery life, etc. The GPU/MDP 550 may compose the different layers of information and merge them into a single screen and render the composed video data on the display 560. The GPU/MDP 550 may comprise a GPU, an MDP, or both.

The display 560 may be a synchronous display (or "dumb display") or an asynchronous display (or "smart display"). A dumb display may require the system to send continuous video data (e.g., all pixels that compose a full frame for every single frame). On the other hand, a smart display may require the system to send only those portions of the video data that have changed (e.g., a subset of the frames in the video data and/or portions of each frame). A dumb display would simply read the processed video data having a reduced frame rate up to the specified display frame rate (e.g., 60 fps in the example of FIG. 5). A smart display would read the processed video data at the same frame rate, and perform additional processing to display the video data at the specified frame rate (e.g., 60 fps).

Examples of Video Data Processing

Figure 6:
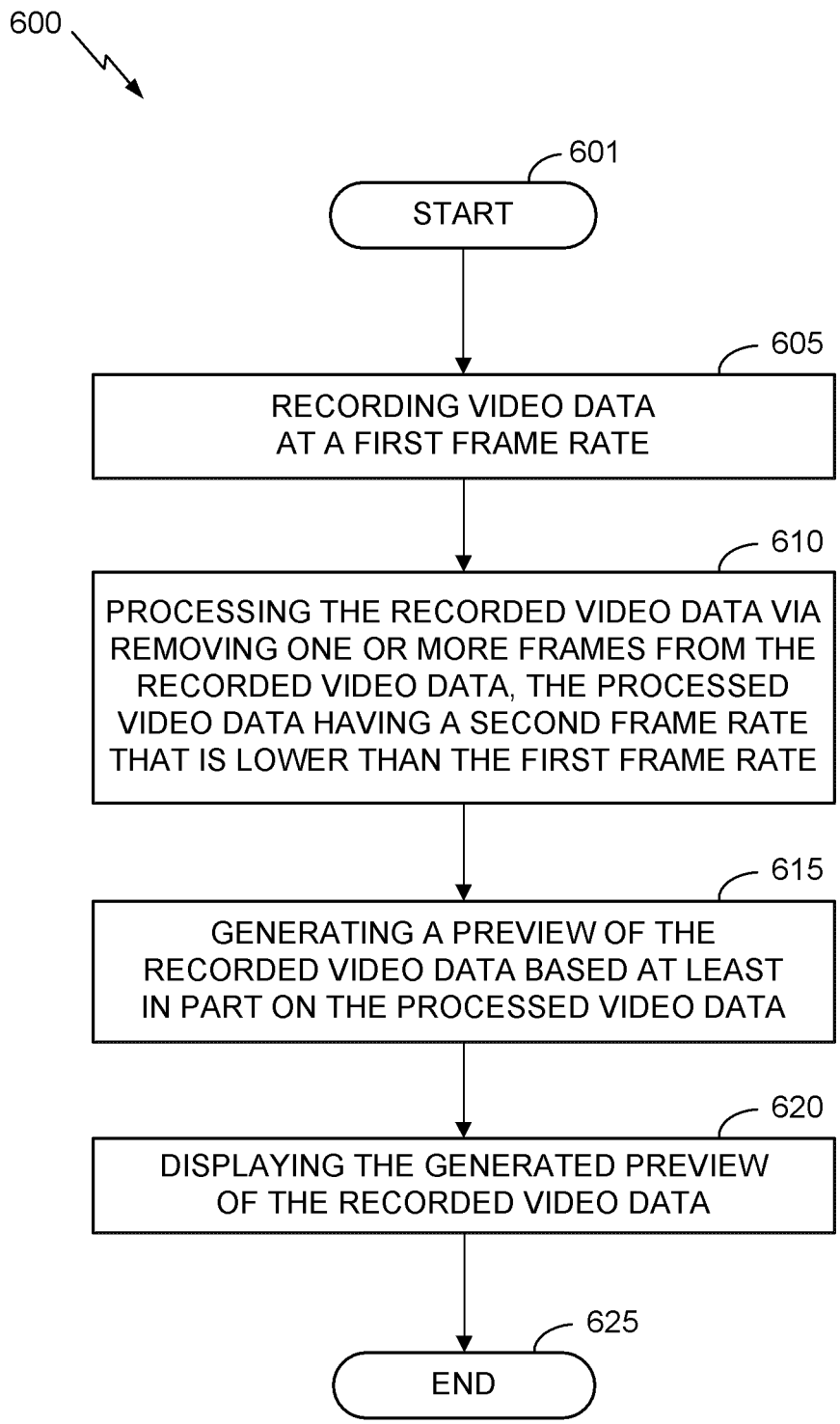
FIG. 6 is a flow chart illustrating an example method of processing video data, according to one embodiment of the present disclosure.

FIG. 6 is a flowchart illustrating a method 600 for coding video information, according to an embodiment of the present disclosure. Some or all of the steps illustrated in FIG. 6 may be performed by any of the devices illustrated in FIGS. 1-5 or one or more components thereof (e.g., the preview processor of FIG. 5). For convenience, method 600 is described as performed by a video device, which may comprise an encoder, a decoder, and/or another other component.

The method 600 begins at block 601. At block 605, the video device records a video data at a first frame rate. In one embodiment, the first frame rate is 30 fps. In some embodiments, if a component of the video device is performing the method 600 (e.g., a processor in the video device), such a component may cause the video data to be recorded at the first frame rate, for example, by instructing the camera of the video device to record the video data. The recorded video data may be stored in a video buffer and processed by various components of the video device. For example, the recorded video data may be processed by a coder (e.g., encoder or decoder) and compressed into a video bitstream for storage and/or transmission. The recorded video data may be processed by a CPP, a GPU and/or a MDP so that a preview generated based on the recorded video data can be displayed on a display of the video device.

At block 610, the video device processes the recorded video data via removing one or more frames from the recorded video data such that the processed video data has a second frame rate that is lower than the first frame rate. For example, the second frame rate may be 25 fps. In another example, the second frame rate can be any frame rate that is lower than the frame rate at which the video data is recorded (e.g., 30 fps). In one embodiment, the one or more frames removed from the recorded video data comprise every 6th frame in the recorded video data. For example, if the video data is recorded at 30 fps, and the video device processes the recorded video data such that every 6th frame in the recorded video data is dropped, the processed video data may have a frame rate of 25 fps. In another embodiment, the one or more frames removed from the recorded video data comprise every 5th frame, every 7th frame, or every N-th frame (where N is an integer greater than zero) in the recorded video data.

At block 615, the video device generates a preview of the recorded video data based on the processed video data. For example, even if the video data is recorded at 30 fps, if the processed video device has a frame rate of 25 fps, the video device may generate the preview based on the processed video data having a frame rate of 25 fps. At block 620, the video device displays the generated preview of the recorded video data, for example, via the display of the video device. The method 600 ends at 625.

As discussed above, one or more components of the video devices illustrated in FIGS. 1-5 may be used to implement any of the techniques discussed in the present disclosure, such as causing the video data to be recorded at the first frame rate, processing the recorded video data via removing the one or more frames from the recorded video data, and generating the preview based on the processed video data.

In the method 600, one or more of the blocks shown in FIG. 6 may be removed (e.g., not performed) or modified, the order in which the method is performed may be switched, and/or one or more additional blocks may be added. For example, instead of causing the video data to be recorded at block 605, the video device may receive or otherwise access video data that has already been recorded and process such video data as described at block 610. Thus, the embodiments of the present disclosure are not limited to or by the example shown in FIG. 6, and other variations may be implemented without departing from the spirit of this disclosure.

Figure 7:
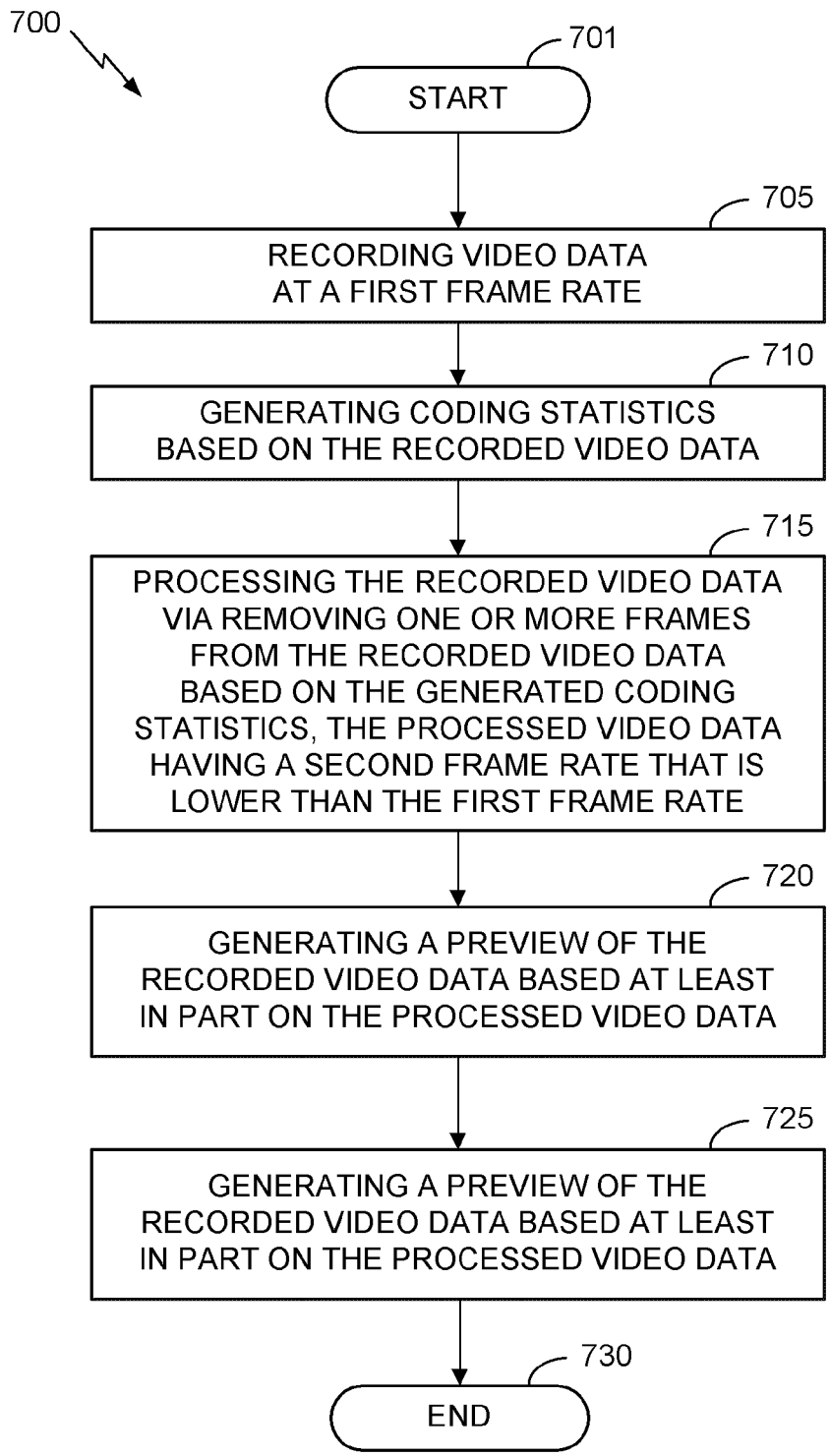
FIG. 7 is a flow chart illustrating an example method of processing video data, according to one embodiment of the present disclosure.

FIG. 7 is a flowchart illustrating a method 700 for coding video information, according to an embodiment of the present disclosure. The steps illustrated in FIG. 7 may be performed by any of the devices illustrated in FIGS. 1-5 or one or more components thereof (e.g., the preview processor of FIG. 5). For convenience, method 700 is described as performed by a video device, which may comprise an encoder, a decoder, and/or another other component.

The method 700 begins at block 701. At block 705, the video device records a video data at a first frame rate. In one embodiment, the first frame rate is 30 fps. In some embodiments, if a component of the video device is performing the method 600 (e.g., a processor in the video device), such a component may cause the video data to be recorded at the first frame rate, for example, by instructing the camera of the video device to record the video data. The recorded video data may be stored in a video buffer and processed by various components of the video device. For example, the recorded video data may be processed by a coder (e.g., encoder or decoder) and compressed into a video bitstream for storage and/or transmission. The recorded video data may be processed by a camera post-processor (CPP), a graphical processing unit (GPU) and/or a multimedia display processor (MDP) so that a preview generated based on the recorded video data can be displayed on a display of the video device.

At block 710, the video device generates coding statistics based on the recorded video data. The coding statistics may include any information generated during the process of encoding the recorded video data in a bitstream and/or decoding the encoded bitstream. For example, the coding statistics may comprise the number of intra-coded, inter-coded, and/or skip blocks, macroblocks, slices, tiles, or other coding units within each frame. For example, the blocks may be in the sizes of 4×4, 16×16, 8×8, 8×16, 16×8, and/or any other size. The coding statistics may also comprise an indication of the region of interest in each frame, if any. The coding statistics may also comprise the color information of each frame in the recorded video data. The color information may comprise YUV data, RGB data, luma data, and/or chroma data. The coding statistics may also comprise voice activity detection (VAD) information. The VAD information may indicate whether human voice is present in each frame. The coding statistics that may be generated by the video device are not limited to those described herein, and may include any other information that may be used to process the recorded video data.

At block 715, the video device processes the recorded video data via removing one or more frames from the recorded video data such that the processed video data has a second frame rate that is lower than the first frame rate. For example, the second frame rate may be 25 fps. In another example, the second frame rate can be any frame rate that is lower than the frame rate at which the video data is recorded (e.g., 30 fps). In one embodiment, the one or more frames removed from the recorded video data comprise every 6th frame in the recorded video data. For example, if the video data is recorded at 30 fps, and the video device processes the recorded video data such that every 6th frame in the recorded video data is dropped, the processed video data may have a frame rate of 25 fps. In another embodiment, the one or more frames removed from the recorded video data comprise every 5th frame, every 7th frame, or every N-th frame (where N is an integer greater than zero) in the recorded video data.

At block 720, the video device generates a preview based on the processed video data. For example, even if the video data is recorded at 30 fps, if the processed video device has a frame rate of 25 fps, the video device may generate the preview based on the processed video data having a frame rate of 25 fps. At block 725, the video device displays the generated preview of the recorded video data, for example, via the display of the video device. The method 700 ends at 730.

As discussed above, one or more components of the video devices illustrated in FIGS. 1-5 may be used to implement any of the techniques discussed in the present disclosure, such as causing the video data to be recorded at the first frame rate, generating the coding statistics based on the recorded video data, processing the recorded video data via removing the one or more frames from the recorded video data based on the coding statistics, and generating the preview based on the processed video data.

In the method 700, one or more of the blocks shown in FIG. 7 may be removed (e.g., not performed) or modified, the order in which the method is performed may be switched, and/or one or more additional blocks may be added. For example, instead of causing the video data to be recorded at block 705, the video device may receive or otherwise access video data that has already been recorded. In another example, instead of generating coding statistics at block 710, the video device (e.g., preview processor shown in FIG. 5) may receive or otherwise access coding statistics generated by another component (e.g., an encoder) and use the coding statistics to process the recorded video data at block 715.

In yet another embodiment, instead of processing the recorded video data based on coding statistics at block 715, the video device (e.g., preview processor shown in FIG. 5) may receive or otherwise access indications of which frames to remove from the recorded video data and process the recorded video data via removing the indicated frames from the recorded video data at block 715. For example, the coder (e.g., encoder or decoder) may specify macroblock (MB) weight values for different macroblock types in the video data. In one embodiment, the weight value is greater for MB types that are less important (e.g., can be removed without significantly affecting the preview quality). For example, a weight value of 16 may be assigned to skip MB, 14 for P16×16 MB, 13 for P8×8 MB, P8×16 MB, and P16×8 MB, 10 for P4×4 MB, 8 for I16×16 MB, and 7 for I4×4 MB. Although specific numerical values are assigned to the MBs for illustration purposes, other values may be assigned to one or more of the MBs or other coding units not described herein. Then, for each frame, a frame weight value is calculated (e.g., by the coder or the preview processor) by summing all the MB weight values of all the MBs in the frame. For example, if a given frame had 20 skip MBs, 60 P16×16 MBs, 100 I16×16 MBs, and 120 I4×4 MBs, the total weight calculated for the given frame would be 20*16+60*14+100*8+120*7=320+840+800+840=2800. In some embodiments, the preview processor performs this calculation based on the coding statistics provided by the coder. In other embodiments, the coder performs this calculation based on the generated coding statistics and provides the result of the calculation to the preview processor. In some embodiments, the calculated weight of the frame may be compared with a threshold value to determine whether to drop or keep the frame. In other embodiments, a moving average of the frame weights of a number of successive frames (e.g., five frames) may be compared with a threshold value, and the preview processor may remove the current frame if the moving average is above the threshold value (or below, depending on how the weight values are calculated). In some embodiments, a constraint may be added that no more than a number of successive frames (e.g., two frames, three frames, etc.) can be removed from the video data.

Thus, the embodiments of the present disclosure are not limited to or by the example shown in FIG. 7, and other variations may be implemented without departing from the spirit of this disclosure.

Reduction in Bandwidth and Power Consumption

Tables 1 and 2 illustrate predicted reductions in the bandwidth and power consumptions that may be achieved in the video devices illustrated in FIGS. 1-5 using the techniques described herein are shown.

TABLE 1

| | | | Reduction in Bandwidth (GPU Composition + MDP Rendering) | | | |
|---|---|---|---|---|---|---|
| Recording scene type | Current preview frame rate | Processed preview frame rate | Bandwidth in current preview path (dumb panel) | Bandwidth in improved preview path (dumb panel) | Bandwidth in current preview path (smart panel) | Bandwidth in improved preview path (smart panel) |
| Video Telephony (1080p) | 30 fps | 24 fps (Avg) | VFE - 92 CPP - 184 GPU - 550 MDP - 490 | VFE - 92 CPP - 147 GPU - 440 MDP - 490 | VFE - 92 CPP - 184 GPU - 550 MDP - 245 | VFE - 92 CPP - 147 GPU - 440 MDP - 196 |
| | | | Total = 1326 MBps | Total = 1169 MBps | Total = 1071 MBps | Total = 875 MBps |

TABLE 1-continued

Reduction in Bandwidth (GPU Composition + MDP Rendering)

| Recording scene type | Current preview frame rate | Processed preview frame rate | Bandwidth in current preview path (dumb panel) | Bandwidth in improved preview path (dumb panel) | Bandwidth in current preview path (smart panel) | Bandwidth in improved preview path (smart panel) |
|---|---|---|---|---|---|---|
| Camcorder (slow moving) | 30 fps | 20 fps (Avg) | VFE - 92<br>CPP - 184<br>GPU - 550<br>MDP - 490<br><br>Total =<br>1326 MBps | VFE - 92<br>CPP - 122<br>GPU - 366<br>MDP - 490<br><br>Total =<br>1070 MBps | VFE - 92<br>CPP - 184<br>GPU - 550<br>MDP - 245<br><br>Total =<br>1071 MBps | VFE - 92<br>CPP - 122<br>GPU - 366<br>MDP - 163<br><br>Total =<br>743 MBps |

In the example of illustrated in Table 1, the reduction in AXI bandwidth is approximately 300 MBps.

TABLE 2

Reduction in Power Consumption (GPU Composition + MDP Rendering)

| Recording scene type | Current preview frame rate | Processed preview frame rate | Power consumption in current preview path (dumb panel) | Power consumption in improved preview path (dumb panel) | Power consumption in current preview path (smart panel) | Power consumption in improved preview path (smart panel) |
|---|---|---|---|---|---|---|
| Video Telephony (1080p) | 30 fps | 24 fps (Avg) | 300 mA | ~260 mA | 280 mA | ~240 mA |
| Camcorder (slow moving) | 30 fps | 20 fps (Avg) | 300 mA | ~220 mA | 280 mA | ~200 mA |

In the example illustrated in Table 2, the reduction in power consumption is approximately 40 mA if the preview frame rate is dropped from 30 fps to 24 fps. An additional drop in the preview frame rate would further reduce the power consumption.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus for recording and processing video information, comprising:
 a memory configured to store video data;
 a display configured to display the stored video data; and
 at least one processor in communication with the memory and the display, the at least one processor configured to:
  record the video data at a first frame rate;
  generate preview video data via removing one or more frames from the recorded video data, the preview video data having a second frame rate that is lower than the first frame rate; and
  cause a preview of the video data currently being recorded at the first frame rate to be displayed by the display at a third frame rate that is different from the first and second frame rates based at least in part on the preview video data having the second frame rate.

2. The apparatus of claim 1, wherein the at least one processor is further configured to instruct the display to display the preview concurrently with the recording of the video data.

3. The apparatus of claim 1, wherein the at least one processor is further configured to generate the preview video data via iteratively removing an N-th frame from the recorded video data, wherein N is an integer greater than one.

4. The apparatus of claim 3, wherein the at least one processor is further configured to generate the preview video data via removing every N-th frame from the recorded video data.

5. The apparatus of claim 1, wherein the at least one processor is further configured to:
 generate coding statistics based at least in part on the recorded video data; and
 select the one or more frames to be removed from the recorded video data based at least in part on the generated coding statistics.

6. The apparatus of claim 1, wherein the apparatus comprises an encoder, and the at least one processor is further configured to encode the video information.

7. The apparatus of claim 1, wherein the apparatus comprises a decoder, and the at least one processor is further configured to decode the video information.

8. The apparatus of claim 1, wherein the at least one processor is further configured to:
 receive coding statistics generated based at least in part on the recorded video data; and
 select the one or more frames to be removed from the recorded video data based at least in part on the received coding statistics.

9. The apparatus of claim 1, wherein the at least one processor is further configured to:
 receive an indication of the one or more frames to be removed from the recorded video data; and
 remove the one or more frames indicated to be removed in the received indication from the recorded video data.

10. The apparatus of claim 1, wherein the at least one processor comprises a preview processor configured to process the recorded video data via a preview path and an encoder processor configured to process the recorded video data via an encoder path.

11. The apparatus of claim 1, wherein the at least one processor is further configured to encode the video data recorded at the first frame rate while the preview is displayed by the display based at least in part on the preview video data having the second frame rate.

12. A method of recording and processing video information, the method comprising:
 recording video data at a first frame rate;
 generating preview video data via removing one or more frames from the recorded video data, the preview video data having a second frame rate that is lower than the first frame rate; and
 displaying, at a third frame rate that is different from the first and second frame rates, a preview of the video data currently being recorded at the first frame rate to be displayed based at least in part on the preview video data having the second frame rate.

13. The method of claim 12, further comprising displaying the preview concurrently with the recording of the video data.

14. The method of claim 12, further comprising generating the preview video data via iteratively removing an N-th frame from the recorded video data, wherein N is an integer greater than one.

15. The method of claim 14, further comprising generating the preview video data via removing every N-th frame from the recorded video data.

16. The method of claim 12, further comprising:
 generating coding statistics based at least in part on the recorded video data; and
 selecting the one or more frames to be removed from the recorded video data based at least in part on the generated coding statistics.

17. The method of claim 12, further comprising encoding the video information in a bitstream.

18. The method of claim 12, further comprising decoding the video information in a bitstream.

19. The method of claim 12, further comprising:
 receiving coding statistics generated based at least in part on the recorded video data; and
 selecting the one or more frames to be removed from the recorded video data based at least in part on the received coding statistics.

20. The method of claim 12, further comprising:
receiving an indication of the one or more frames to be removed from the recorded video data; and
removing the one or more frames indicated to be removed in the received indication from the recorded video data.

21. A non-transitory computer readable medium comprising code that, when executed, causes an apparatus to:
record video data at a first frame rate;
generate preview video data via removing one or more frames from the recorded video data, the preview video data having a second frame rate that is lower than the first frame rate; and
cause a preview of the video data currently being recorded at the first frame rate to be displayed at a third frame rate that is different from the first and second frame rates based at least in part on the preview video data having the second frame rate.

22. The computer readable medium of claim 21, wherein the code further causes the apparatus to generate the preview video data via iteratively removing an N-th frame from the recorded video data, wherein N is an integer greater than one.

23. The computer readable medium of claim 22, wherein the code further causes the apparatus to generate the preview video data via removing every N-th frame from the recorded video data.

24. The computer readable medium of claim 21, wherein the code further causes the apparatus to:
generate coding statistics based at least in part on the recorded video data; and
select the one or more frames to be removed from the recorded video data based at least in part on the generated coding statistics.

25. A video device configured to record and process video information, the video device comprising:
means for recording video data at a first frame rate;
means for generating preview video data via removing one or more frames from the recorded video data, the preview video data having a second frame rate that is lower than the first frame rate; and
means for causing a preview of the video data currently being recorded at the first frame rate to be displayed at a third frame rate that is different from the first and second frame rates based at least in part on the preview video data having the second frame rate.

26. The video device of claim 25, wherein the process further comprises means for generating the preview video data via iteratively removing an N-th frame from the recorded video data, wherein N is an integer greater than one.

27. The video device of claim 26, wherein the process further comprises means for generating the preview video data via removing every N-th frame from the recorded video data.

28. The video device of claim 25, further comprising:
means for generating coding statistics based at least in part on the recorded video data; and
means for selecting the one or more frames to be removed from the recorded video data based at least in part on the generated coding statistics.

\* \* \* \* \*